(12) United States Patent
Chuang

(10) Patent No.: US 11,927,796 B1
(45) Date of Patent: Mar. 12, 2024

(54) DISPLAY DEVICE

(71) Applicant: AUO Display Plus Corporation, Hsinchu (TW)

(72) Inventor: Ming-Hsin Chuang, Hsinchu (TW)

(73) Assignee: AUO DISPLAY PLUS CORPORATION, Hsinchu (TW)

( * ) Notice: Subject to any disclaimer, the term of this patent is extended or adjusted under 35 U.S.C. 154(b) by 0 days.

(21) Appl. No.: 18/116,328

(22) Filed: Mar. 2, 2023

(30) Foreign Application Priority Data

Jan. 18, 2023 (TW) .................................. 112102473

(51) Int. Cl.
*F21V 8/00* (2006.01)
*G02F 1/1333* (2006.01)

(52) U.S. Cl.
CPC ..... *G02B 6/0088* (2013.01); *G02F 1/133314* (2021.01); *G02F 1/133317* (2021.01)

(58) Field of Classification Search
CPC ............. G02B 6/0088; G02F 1/133314; G02F 1/133317
See application file for complete search history.

(56) References Cited

U.S. PATENT DOCUMENTS

| 9,671,549 | B2 | 6/2017 | Que | |
|---|---|---|---|---|
| 2013/0201421 | A1* | 8/2013 | Yu | G02F 1/133615 248/309.1 |
| 2015/0212262 | A1* | 7/2015 | Chiang | G02B 6/0093 362/611 |
| 2020/0064542 | A1* | 2/2020 | Li | G02B 6/0081 |

FOREIGN PATENT DOCUMENTS

| CN | 103032763 A | 4/2013 |
|---|---|---|
| CN | 207080867 U | 3/2018 |
| CN | 208172429 U | 11/2018 |
| TW | 201420961 A * | 6/2014 |

* cited by examiner

*Primary Examiner* — Keith G. Delahoussaye
(74) *Attorney, Agent, or Firm* — WPAT, P.C

(57) ABSTRACT

A display device includes a frame body, a positioning unit, a light guide plate, and an elastic unit. The frame body includes a back plat which includes a limiting slot. The positioning includes a loading portion, a side wall portion, and a positioning protrusion. The positioning protrusion is located on the loading portion and extends toward the back plate to fit in the limiting slot. When the elastic unit is in the non-compressed state, one end of the elastic unit abuts against the side wall plate, and the other end abuts against the side wall portion so that the positioning protrusion is at a first position of the limiting slot. When the light guide plate is heated, the positioning protrusion is driven to move to a second position of the limiting slot, and the elastic unit is pressed to be in the compressed state.

10 Claims, 16 Drawing Sheets

DISPLAY DEVICE

CROSS-REFERENCE TO RELATED APPLICATION

This non-provisional application claims priority under 35 U.S.C. § 119(a) to Patent Application No. 112102473 filed in Taiwan, R.O.C. on Jan. 18, 2023, the entire contents of which are hereby incorporated by reference.

BACKGROUND

Technical Field

The present invention relates to a display device, and in particular, to a display device with a backlight module that can avoid a light leakage.

Related Art

In response to continuous upgrading of display devices, users have higher requirements for visual experience of display devices. Display devices with narrow bezels gradually become a mainstream in the market. In a common backlight module, a structure formed on a side of a back plate, such as a positioning post and a side wall tongue, is accommodated in an expansion space on a side of a light guide plate, to position the light guide plate (as shown in FIG. 1). However, since the bezels are becoming narrow, a light leakage cause when the expansion space of the light guide plate enters a visual area is likely to occur, which affects the visual experience of the users.

SUMMARY

Based on the above, an embodiment provides a display device. The display device includes a frame body, a positioning unit, a light guide plate, and an elastic unit. The frame body includes a side wall plate and a back plate connected to each other. The back plate includes a limiting slot. The positioning unit is located in the frame body and includes a loading portion, a side wall portion, and a positioning protrusion. The loading portion is substantially parallel to the back plate and connected to the side wall portion. The positioning protrusion is located on the loading portion and extends toward the back plate to fit in the limiting slot. The elastic unit is located in the frame body and has a compressed state or a non-compressed state. When the elastic unit is in the non-compressed state, one end of the elastic unit abuts against the side wall plate, and the other end abuts against the side wall portion so that the positioning protrusion is at a first position of the limiting slot. When the light guide plate is heated, the positioning protrusion is driven to move to a second position of the limiting slot, and the elastic unit is pressed to be in the compressed state.

Another embodiment provides a display device. The display device includes a frame body, a positioning unit, and a light guide plate. The frame body includes a side wall plate and a back plate connected to each other, and the back plate includes a positioning protrusion. The positioning unit is located in the frame body and includes a loading portion, a side wall portion, and a limiting slot. The loading portion is substantially parallel to the back plate and connected to the side wall portion, and the limiting slot is located on the loading portion for the positioning protrusion to fit in. The light guide plate is located on the loading portion and abuts against the side wall portion. The elastic unit is located in the frame body and varies between a compressed state and a non-compressed state. When the elastic unit is in the non-compressed state, one end of the elastic unit is against the side wall plate, and the other end abuts against the side wall portion so that the positioning protrusion is at a first position of the limiting slot. When the light guide plate is heated, the positioning protrusion is driven to move to a second position of the limiting slot, and the elastic unit is pressed to be in the compressed state.

According to the display device of the present invention, the light guide plate and the elastic unit of the display device abut against the side wall portion of the positioning unit, which does not require an expansion space reserved between a light guide plate and a positioning post in a conventional backlight module, so that a light leakage from the expansion space can be avoided. In addition, when the light guide plate expands or shrinks due to a temperature, the positioning protrusion is limited in a wide edge direction of the limiting slot and does not move, so that the positioning unit can be limited, thereby limiting the light guide plate.

DETAILED DESCRIPTION

First Embodiment

Figure 1:
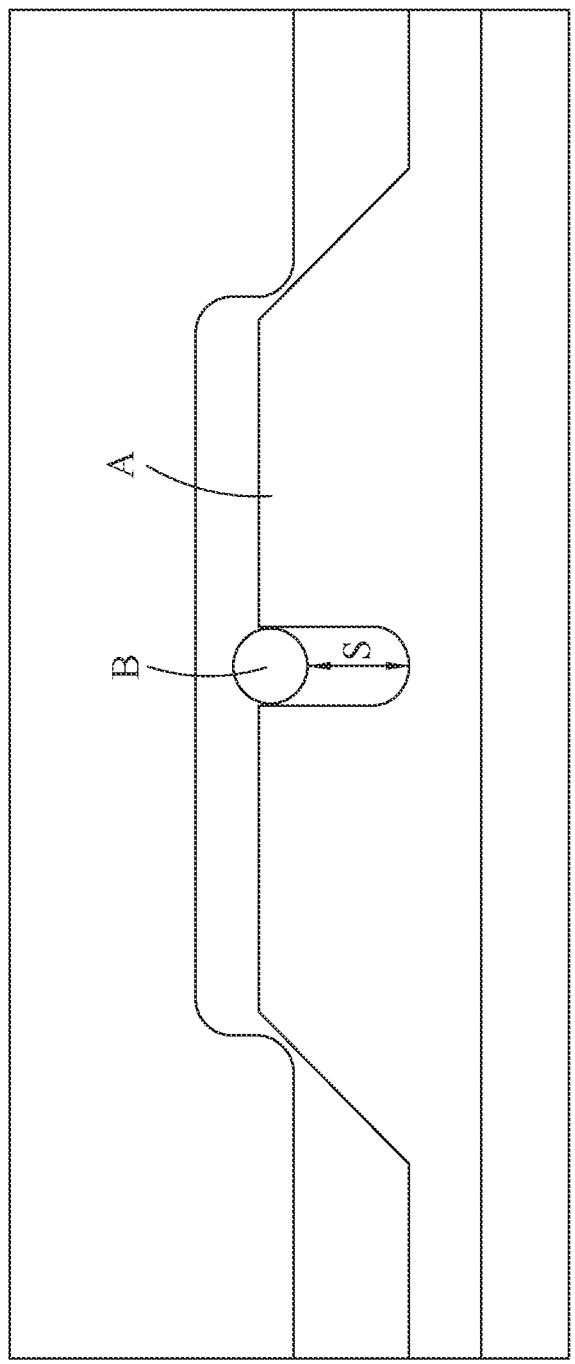
FIG. 1 is a three-dimensional schematic diagram of a conventional backlight module.

Referring to FIG. 2 to FIG. 4a and FIG. 4b, a display device 100 may include a frame body 10, a positioning unit 20, a light guide plate 30, and an elastic unit 40.

Figure 2:
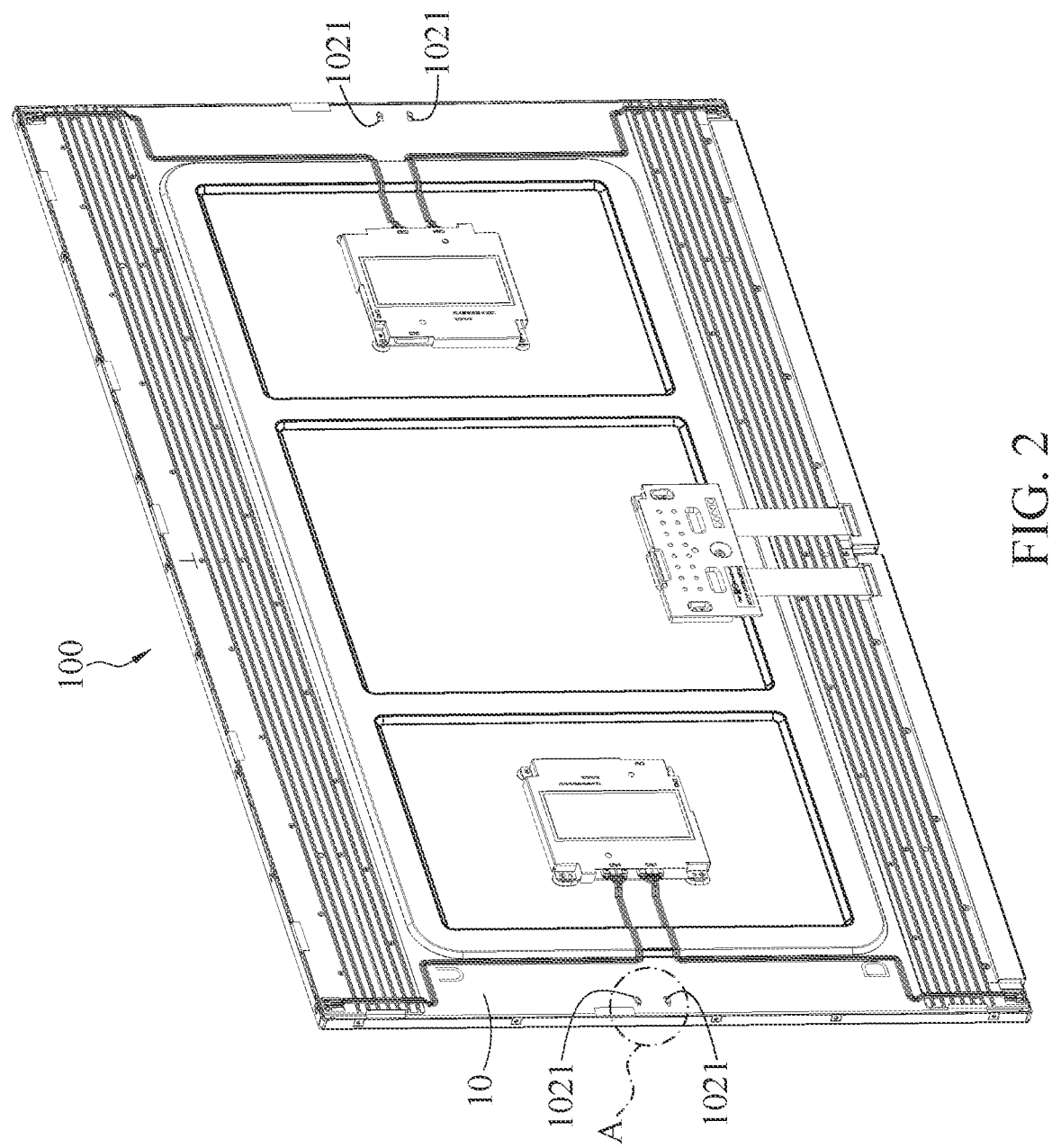
FIG. 2 is a three-dimensional schematic diagram according to a first embodiment.

The frame body 10 includes a side wall plate 101 and a back plate 102 connected to each other. The back plate 102 has an upper surface 102a and a lower surface 102b opposite to each other, and may be provided with a limiting slot 1021. An included angle between the side wall plate 101 and the back plate 102 may be 90°, but the present invention is not limited thereto. For example, the included angle may be other angles such as an angle between 45° and 135°, or preferably, an angle between 80° and 100°. In FIG. 2, the back plate 102 includes four limiting slots 1021, for example, but the present invention is not limited thereto. A different quantity of limiting slots 1021 may be arranged according to an actual design requirement.

Figure 3:
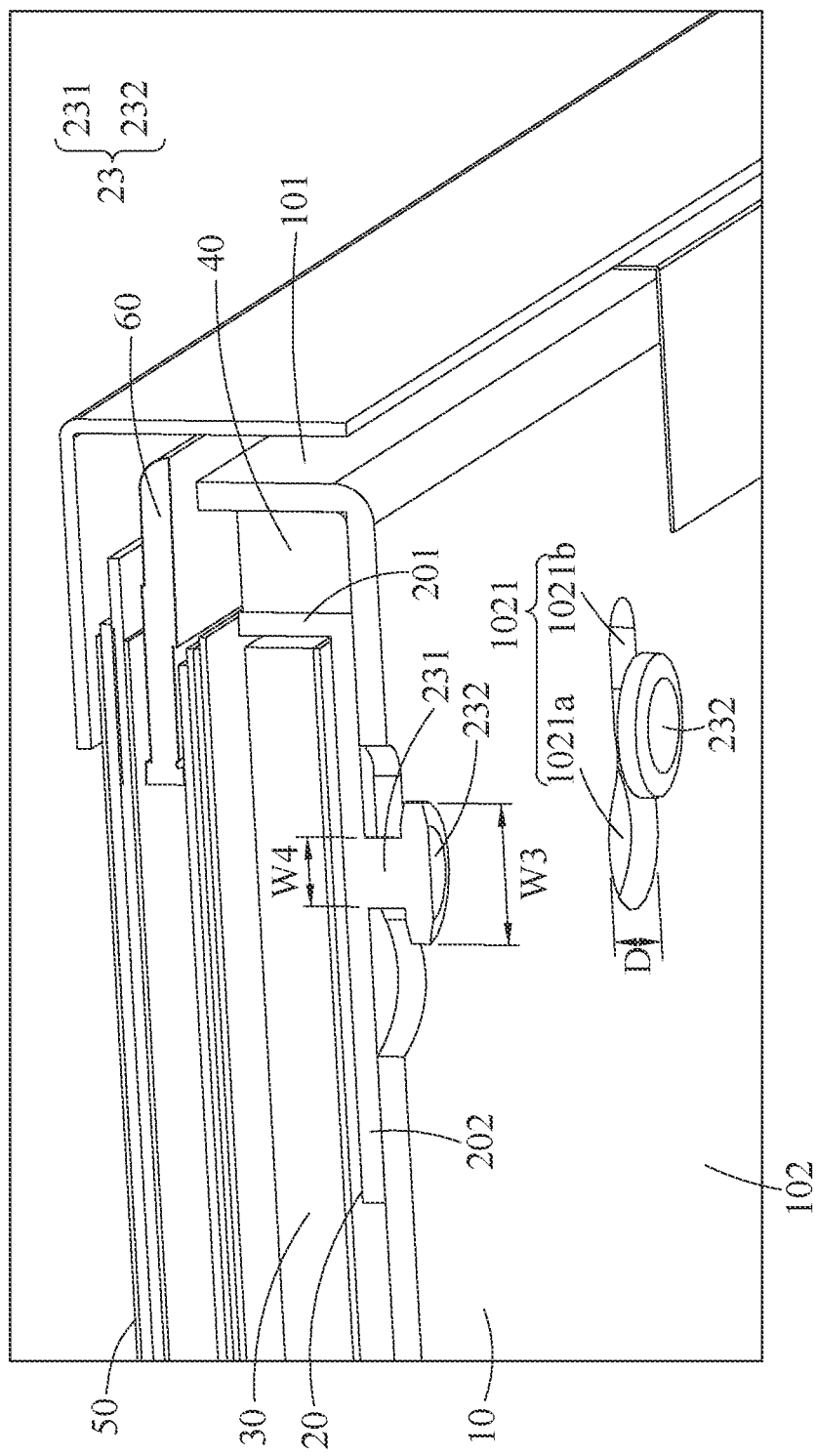
FIG. 3 is a partial schematic cross-sectional view of a display device according to the first embodiment.
Figure 4A:
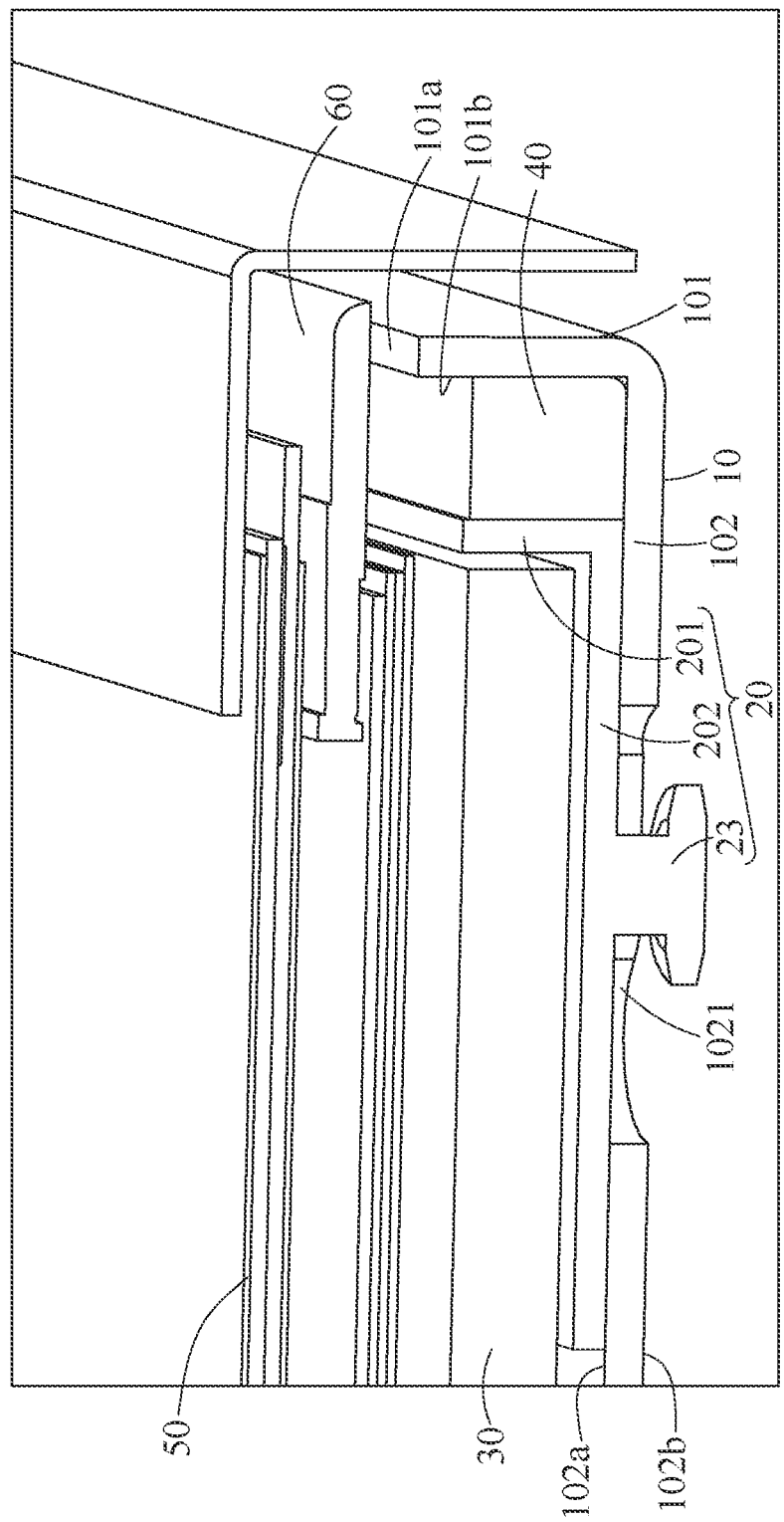
FIG. 4a is a partial schematic cross-sectional view (I) of the display device according to the first embodiment from another perspective.
Figure 4B:
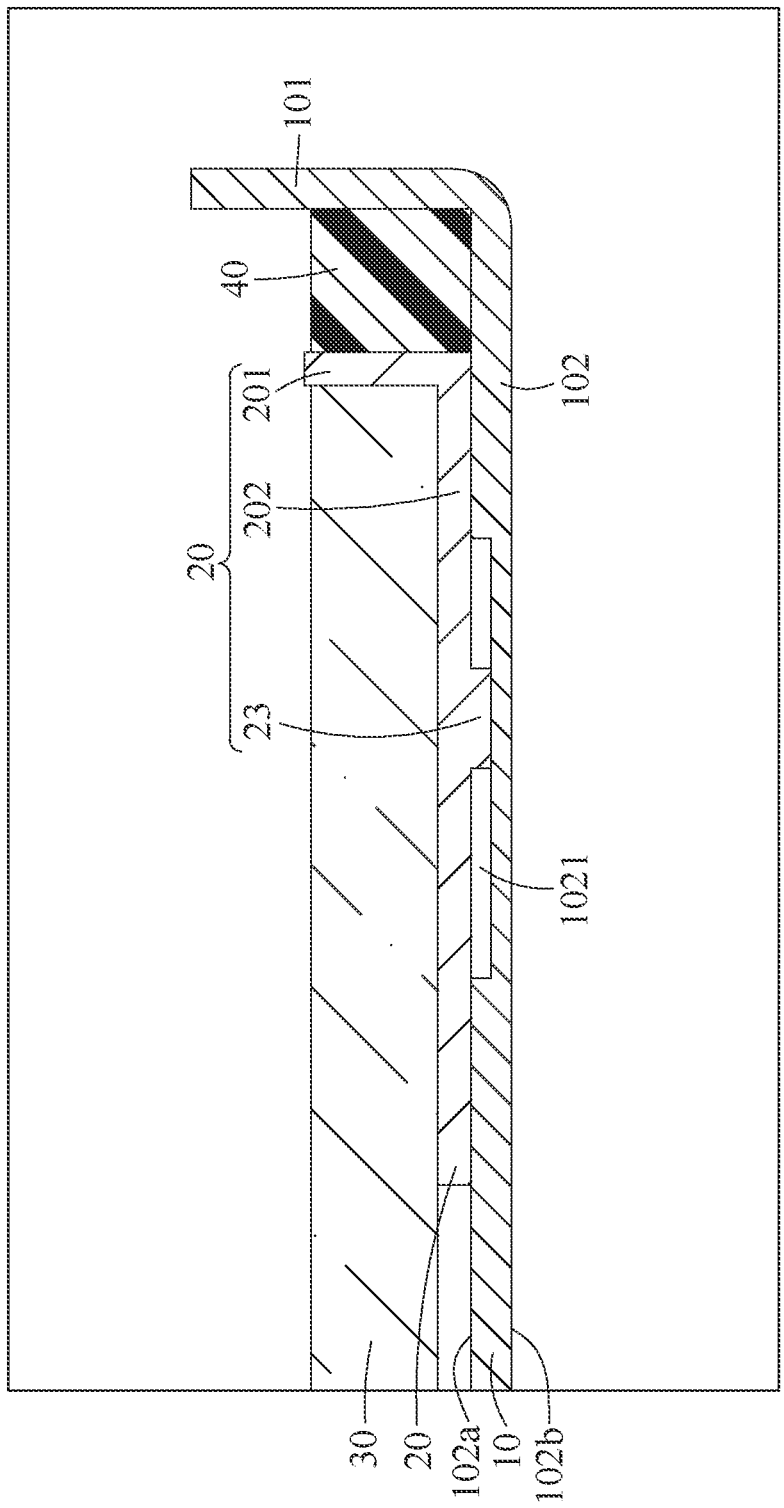
FIG. 4b is a partial schematic partial cross-sectional view (II) of the display device according to the first embodiment from another perspective.

In some embodiments, as shown in FIG. 3 and FIG. 4a, each of the limiting slots 1021 may extend through the upper surface 102a and the lower surface 102b of the back plate 102 opposite to each other, but the present invention is not limited thereto. As shown in FIG. 4b, the limiting slot 1021 may alternatively be recessed on the upper surface 102a of the back plate 102. The positioning unit 20 is located in the frame body 10. The positioning unit may mainly include a side wall portion 201, a loading portion 202, and a positioning protrusion 23. The loading portion 202 is substantially parallel to the back plate 102 and connected to the side wall portion 201. The side wall portion 201 is also substantially parallel to the side wall plate 101 of the frame body 10. The positioning protrusion 23 is located on the loading portion 202 and extends toward the back plate 102 fit in the limiting slot 1021. In other words, the positioning protrusion 23 extends from a side of the loading portion 202 facing the back plate 102 and may fit in the limiting slot 1021. Further, referring also to FIG. 4b, the light guide plate 30 may be arranged on the loading portion 202 and abuts against the side wall portion 201 of the positioning unit 20.

Figure 5:
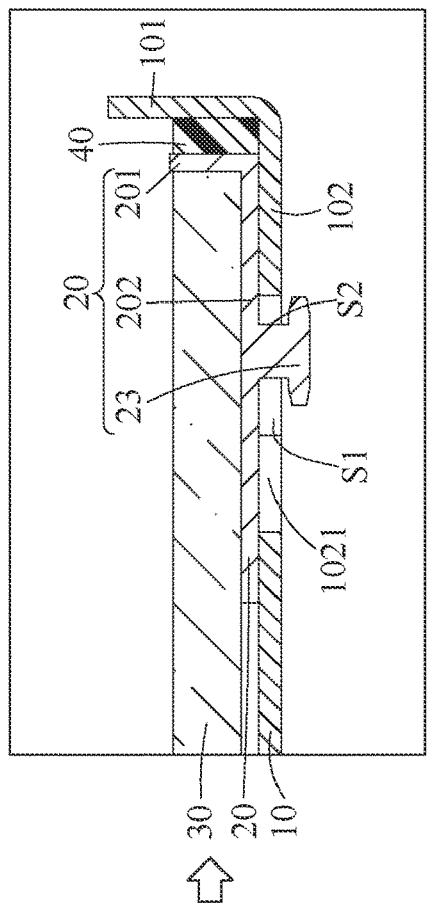
FIG. 5 is a schematic cross-sectional view in which a positioning protrusion is at a first position of a limiting slot according to the first embodiment.
Figure 6:
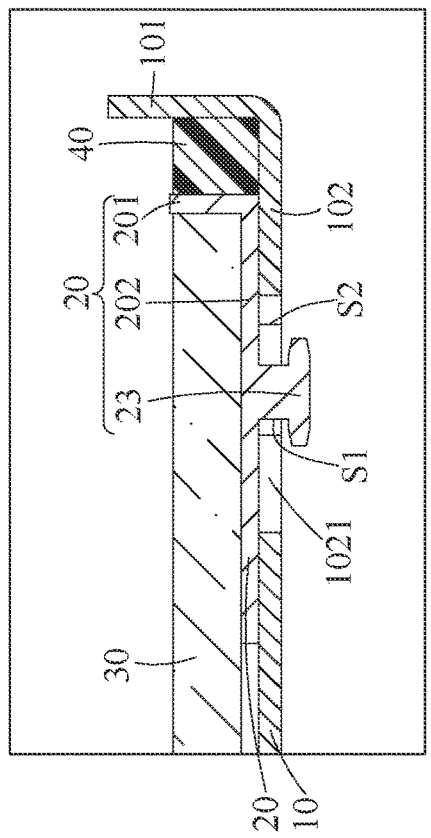
FIG. 6 is a schematic cross-sectional view in which the positioning protrusion is at a second position of the limiting slot according to the first embodiment.

Referring to FIG. 4a, FIG. 5, and FIG. 6, the elastic unit 40 is located in the frame body 10, which may vary between a non-compressed state (as shown in FIG. 5) and a compressed state (as shown in FIG. 6). When the elastic unit 40 is in the non-compressed state, one end of the elastic unit abuts against an inner side surface 101b of the side wall plate 101 of the frame body 10, and the other end abuts against the side wall portion 201 of the positioning unit 20 so that the positioning protrusion 23 is at a first position S1 of the limiting slot 1021 (as shown in FIG. 5). When the light guide plate 30 is heated to expand, a surface of the light guide plate 30 in contact with the side wall portion 201 abuts against the side wall portion 201, so that the positioning unit 20 moves, and the positioning protrusion 23 is driven to move to a second position S2 of the limiting slot 1021 (as shown in FIG. 6), so that the elastic unit 40 is pressed to be in the compressed state. The elastic unit 40 herein may be a foam, and preferably, a foam with a Young's modulus less than 0.4 MPa, but the present invention is not limited thereto. The elastic unit 40 may alternatively be an elastomer such as a rubber or a spring, and a Young's modulus of the elastomer is less than 0.4 MPa.

When the elastic unit 40 is in the compressed state, the elastic unit 40 generates a change of form. The change of form is a change of the elastic unit 40 under pressure. For example, if a total volume of the elastic unit 40 remains the same but a shape changes, a contact area (an area of contact with the frame body 10 or an area of contact with the positioning unit 20) may increase, or the contact area may remain the same. For another example, the total volume of the elastic unit 40 becomes smaller, but the contact area remains the same (for example, the elastic unit becomes flatter), or the contact area may increase accordingly. The above description is an example instead of a limitation. The change of form of the elastic unit 40 depends on a material and an actual structural design of the frame body 10 and the positioning unit 20.

Figure 7:
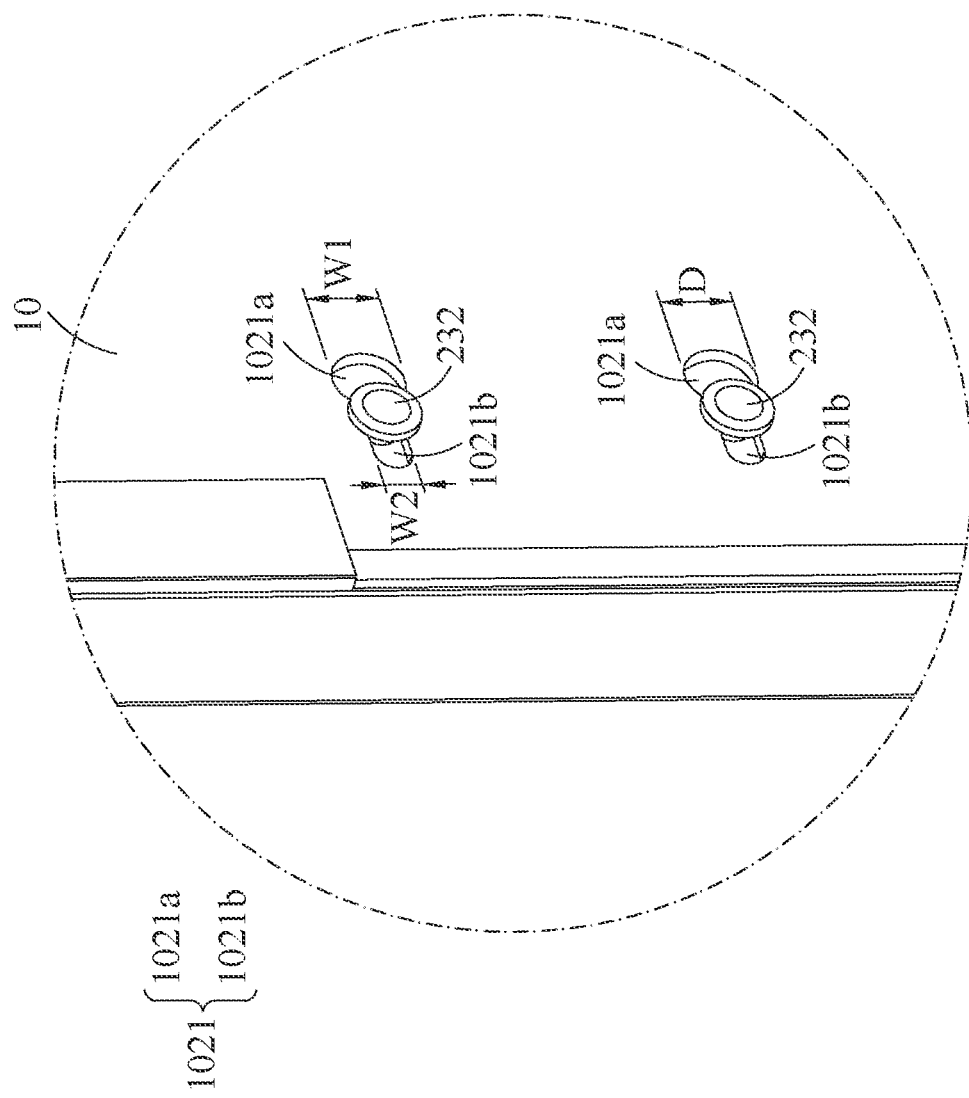
FIG. 7 is a partial schematic enlarged view of A in FIG. 2.

Referring to FIG. 7, regardless of whether the elastic unit 40 is in the compressed state or the non-compressed state, the light guide plate 30 and the elastic unit 40 abut against the side wall portion 201 of the positioning unit 20. Therefore, an expansion space S (shown in FIG. 1) reserved between a light guide plate A and a positioning post B in a conventional backlight module is not required, so that a light leakage from the expansion space can be avoided. In addition, when the light guide plate 30 expands or shrinks due to a temperature, the positioning protrusion 23 is limited by the limiting slot 1021 in a wide edge direction D of the limiting slot 1021 and does not move, so that the positioning unit 20 can be limited, thereby limiting the light guide plate 30.

Referring to FIG. 7, in some implementations, the limiting slot 1021 may include a first slot portion 1021a and a second slot portion 1021b. A width W1 of the first slot portion 1021a is greater than a width W2 of the second slot portion 1021b. In addition, as shown in FIG. 5 and FIG. 6, the first position S1 and the second position S2 both may be on the second slot portion 1021b. The first slot portion 1021a may be substantially circular, and the second slot portion 1021b may be substantially rectangular. However, the structural description of the limiting slot 1021 is merely an example, and the present invention is not limited thereto.

Referring to FIG. 7 to FIG. 10, the positioning protrusion 23 may include a support portion 231 and a top portion 232. The top portion 232 is located on an end of the support portion 231 away from the loading portion 202. An overall cross section of the positioning protrusion is substantially T-shaped. A width W3 of the top portion 232 is greater than a width W4 of the support portion 231, and the top portion 232 of the positioning protrusion 23 extends through the first slot portion 1021a so that the support portion 231 is located on the first slot portion 1021a. In this way, the support portion 231 can freely move in the first slot portion 1021a and the second slot portion 1021b.

Figure 8:
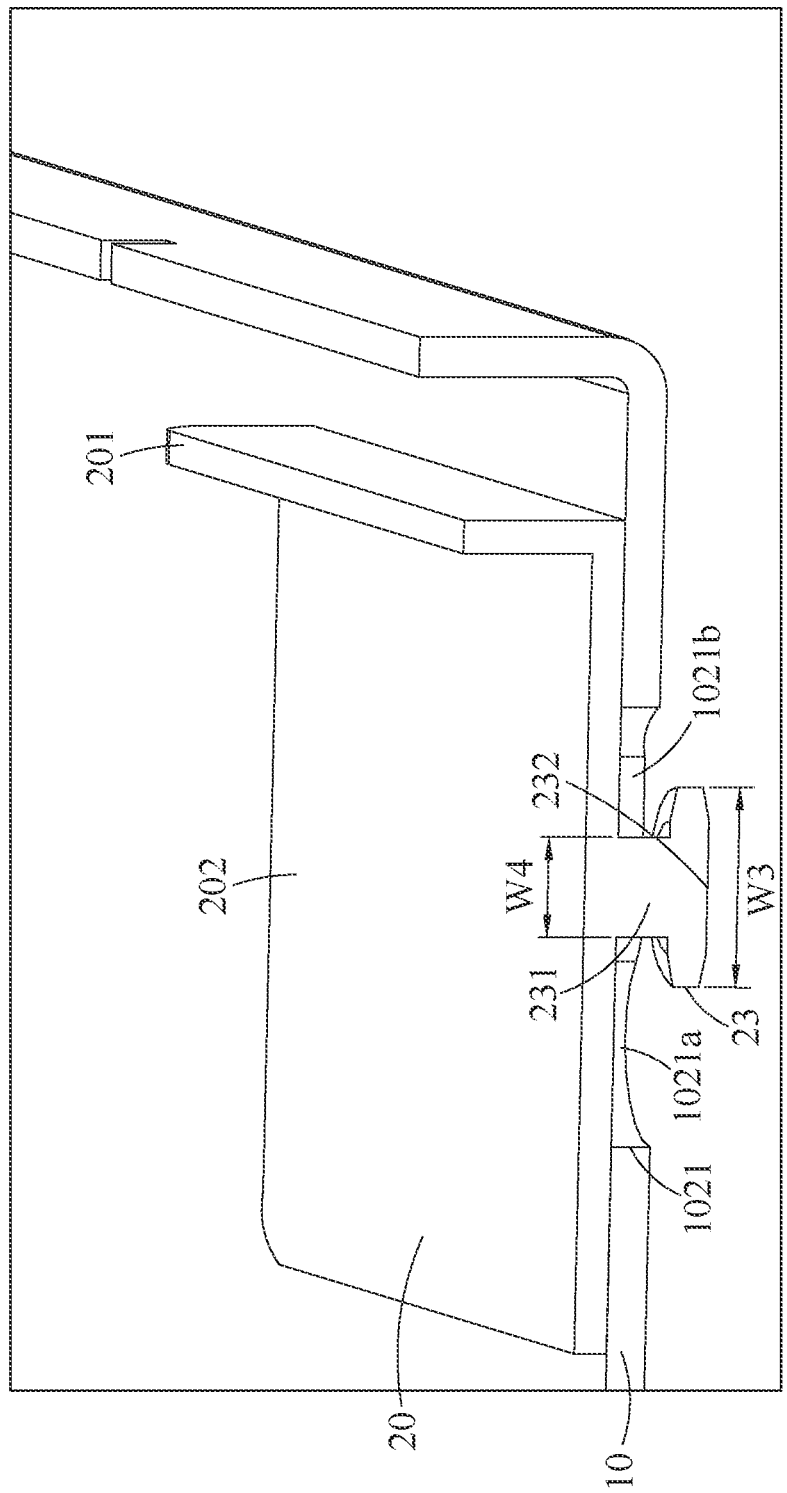
FIG. 8 is a three-dimensional schematic diagram of a frame body and a positioning unit according to the first embodiment.
Figure 9:
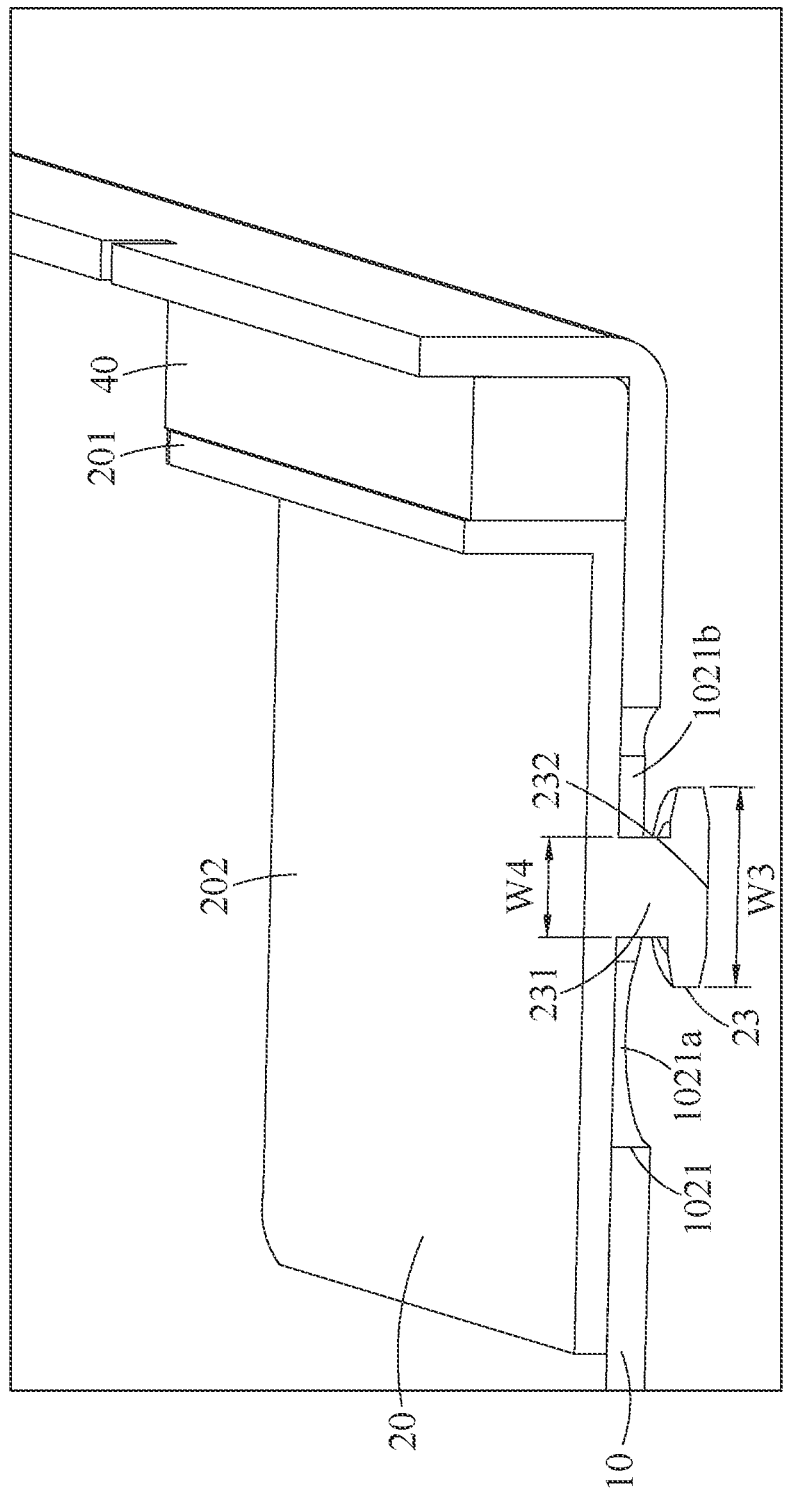
FIG. 9 is a three-dimensional schematic diagram of the frame body, the positioning unit, and an elastic unit according to the first embodiment.
Figure 10:
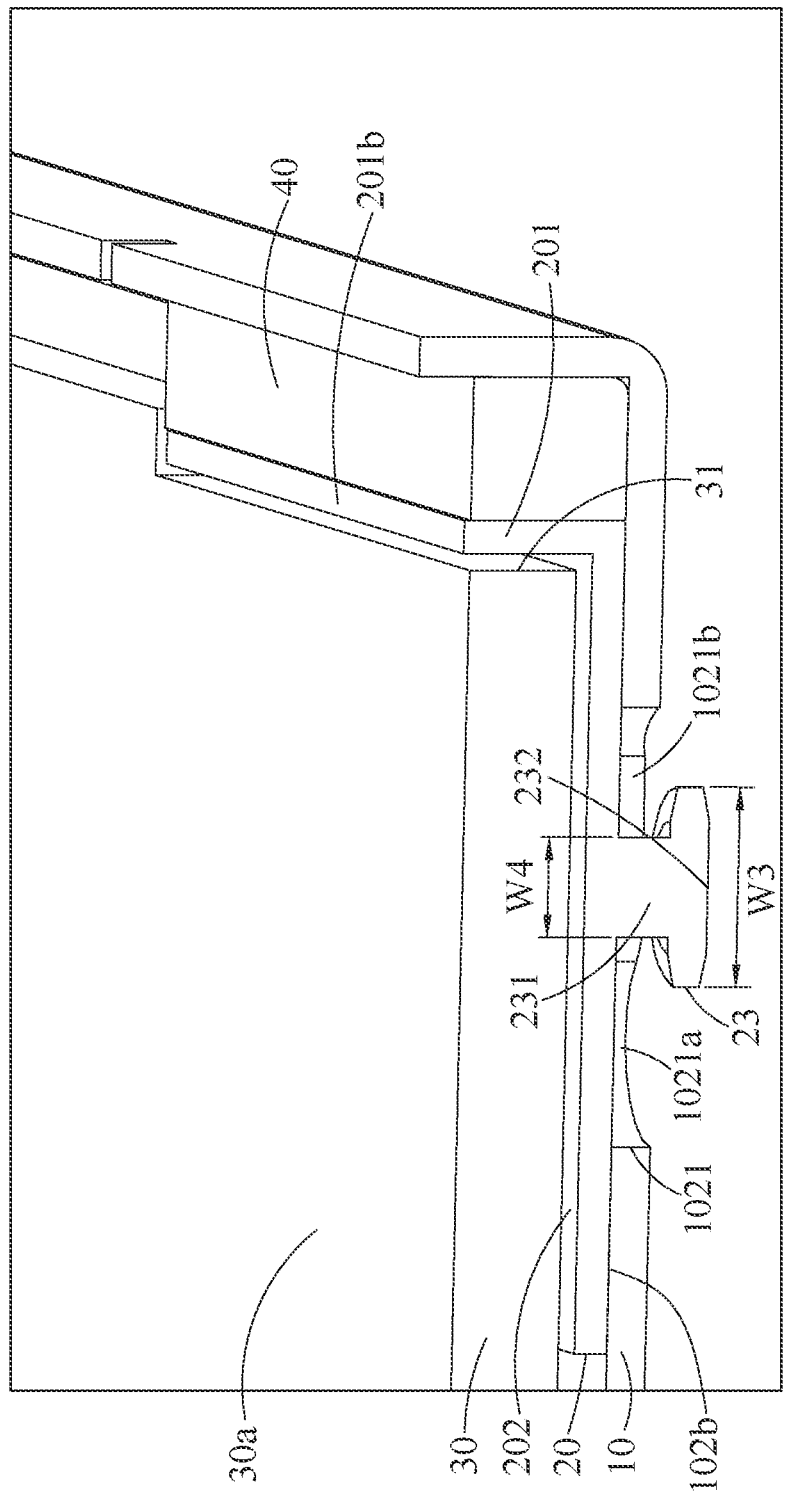
FIG. 10 is a three-dimensional schematic diagram of the frame body, the positioning unit, a light guide plate, and the elastic unit according to the first embodiment.

Further, the width W1 of the first slot portion 1021a is greater than or equal to the width W3 of the top portion 232, and the width W2 of the second slot portion 1021b is less than the width W3 of the top portion 232. During assembly, the top portion 232 is first caused to extend through the first slot portion 1021a so that the support portion 231 enters the limiting slot 1021, then the positioning protrusion 23 is moved to a position corresponding to the second slot portion 1021b (as shown in FIG. 8), and the elastic unit 40 is placed (as shown in FIG. 9). In this case, the support portion 231 is located in the second slot portion 1021b, and the top portion 232 is located on the lower surface 102b outside the second slot portion 1021b. Next, the light guide plate 30 is placed on the loading portion 202 of the positioning unit 20 (as shown in FIG. 10). Since the width W2 of the second slot portion 1021b is less than the width W3 of the top portion 232, the top portion 232 is limited by the second slot portion 1021b and does not move upward out of the limiting slot 1021.

In FIG. 8 to FIG. 10, the support portion 231 of the positioning protrusion 23 is substantially columnar and the top portion 232 is substantially disc-shaped. The positioning protrusion 23 may alternatively be a bendable material (such as an iron sheet and an aluminum sheet), and the support portion 231 and the top portion 232 are formed by bending the positioning protrusion 23. However, the present invention is not limited thereto, as long as the width W3 of the top portion 232 is greater than the width W4 of the support portion 231.

Referring to FIG. 3 and FIG. 4a again, in some implementations, the display device 100 may further include a panel unit 50 and a rubber frame 60. The rubber frame 60 is positioned on the frame body 10, and the panel unit 50 is positioned on the rubber frame 60 and superimposed on the light guide plate 30. The rubber frame 60 may be a plate structure substantially parallel to the back plate 102, which is fixed to a top surface 101a of the side wall plate 101 of the frame body 10 and may carry the panel unit 50. Therefore, the panel unit 50 is located above the light guide plate 30. When the light guide plate 30 is heated to expand, a surface of the light guide plate 30 in contact with the side wall portion 201 abuts against the side wall portion 201 of the positioning unit 20, so that the positioning unit 20 moves, and the positioning unit 20 is driven to move relative to the panel unit 50. That is to say, since the panel unit 50 is fixed to the rubber frame 60 and does not move, when the light guide plate 30 is heated to expand, the positioning unit 20 to move relative to the panel unit 50.

Referring to FIG. 10, in some implementations, the light guide plate 30 may include a recess 31 located on a side of the light guide plate 30, and an opening of the recess 31 faces the side of the light guide plate 30. That is to say, the recess 31 is a recessed structure of the light guide plate 30 on the side. Therefore, the side wall portion 201 of the positioning unit 20 may fit in the recess 31 to engage the light guide plate 30 with the positioning unit 20. Since the positioning protrusion 23 of the positioning unit 20 is limited by the limiting slot 1021 in the wide edge direction D (that is, a direction D in FIG. 7) of the limiting slot 1021, the side wall portion 201 of the positioning unit 20 can fit in the recess 31 of the light guide plate 30 to prevent movement of the light guide plate 30, thereby positioning the light guide plate 30. The side wall portion 201 does not protrude from the light guide plate 30, that is, a top surface 201b of the side wall portion 201 is substantially coplanar with a top surface 30a of the light guide plate 30. The recess 31 may be U-shaped, rectangular, or the like.

Figure 11:
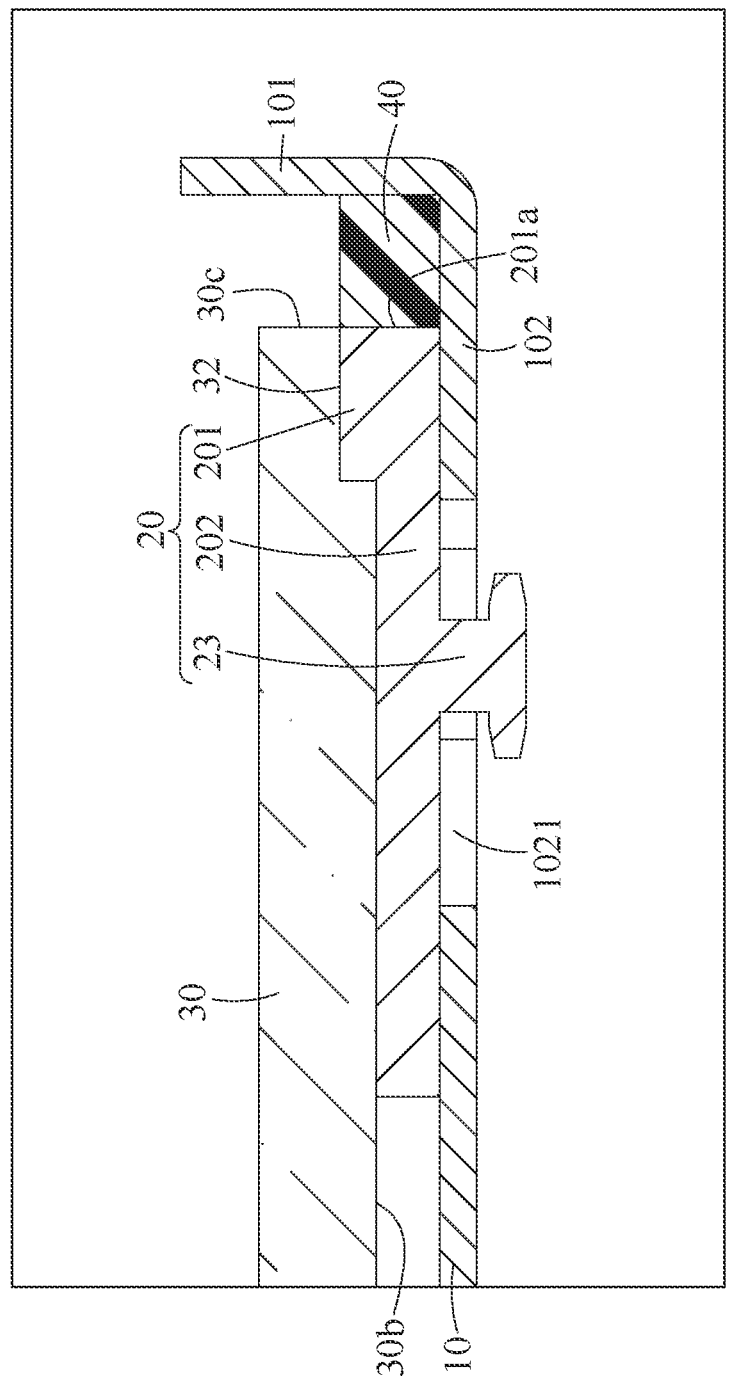
FIG. 11 is a partial schematic cross-sectional view (III) of the display device according to the first embodiment from another perspective.

Referring to FIG. 11, in some embodiments, the light guide plate 30 may include a bottom surface 30b and a fitting slot 32. The bottom surface 30b faces the loading portion 202, and the fitting slot 32 is located on the bottom surface 30b (that is, the fitting slot 32 is recessed on the bottom surface 30b). That is to say, the fitting slot 32 is a recessed structure of the light guide plate 30 on the bottom surface 30b. A thickness of the light guide plate 30 at the fitting slot 32 is less than thicknesses at other positions (where the fitting slot 32 is not arranged) in a direction substantially perpendicular to a horizontal plane. Therefore, the side wall portion 201 of the positioning unit 20 fits in the fitting slot 32 to engage the light guide plate 30 with the positioning unit 20, thereby positioning the light guide plate 30. In FIG. 11, the side wall surface 30c of the light guide plate 30 and the side wall surface 201a of the side wall portion 201 facing the frame body 10 are substantially coplanar, but the present invention is not limited thereto. The light guide plate 30 may alternatively protrude from the side wall portion 201, so that a part of the light guide plate 30 is located above the elastic unit 40.

Second Embodiment

It should be noted that in this embodiment, the same parts as the first embodiment are marked with the same element symbols, and description of the same elements and structures is not repeated.

Figure 12A:
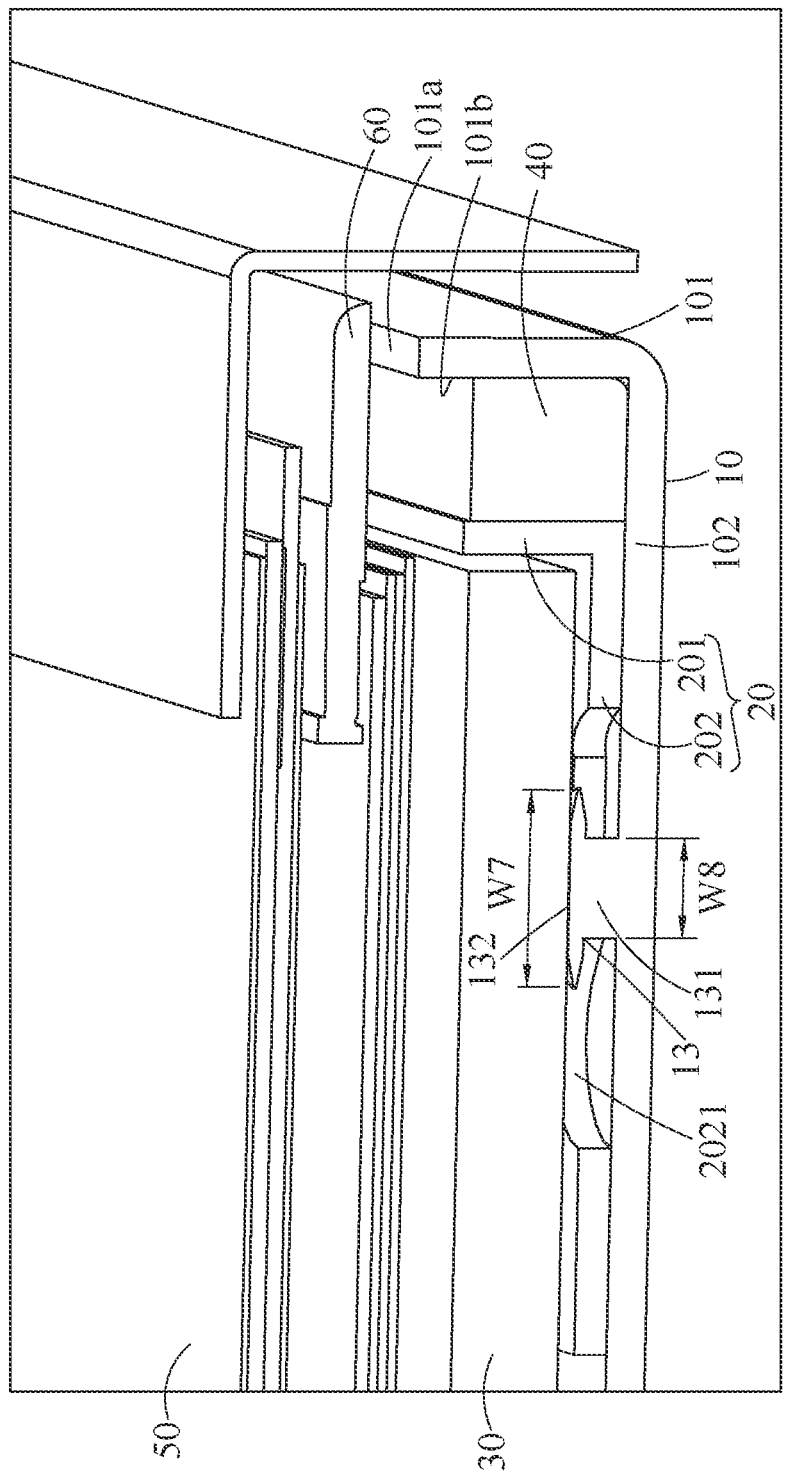
FIG. 12a is a partial schematic cross-sectional view of a display device according to a second embodiment.
Figure 12B:
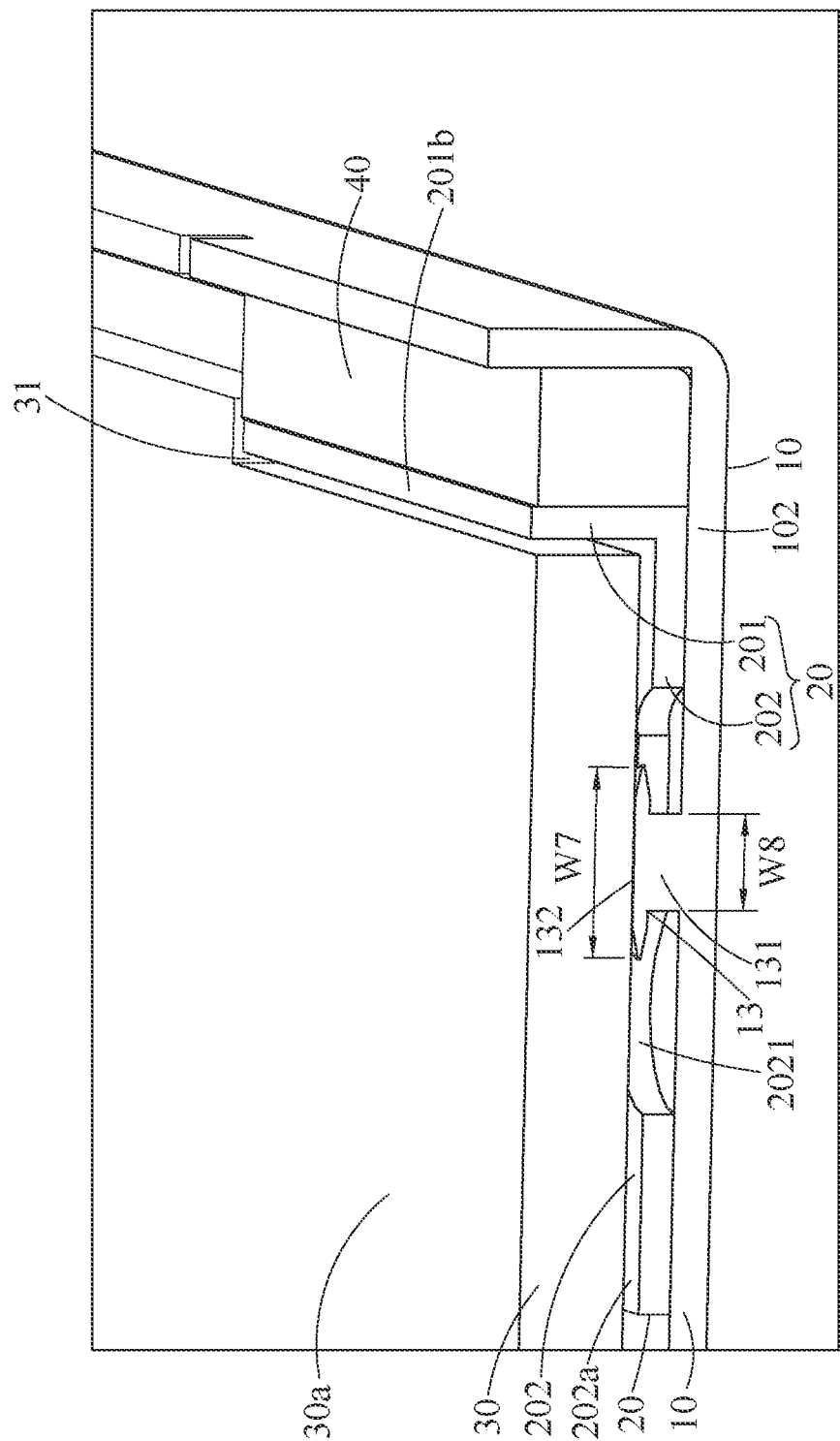
FIG. 12b is a partial schematic cross-sectional view (I) of the display device according to the second embodiment from another perspective.
Figure 13:
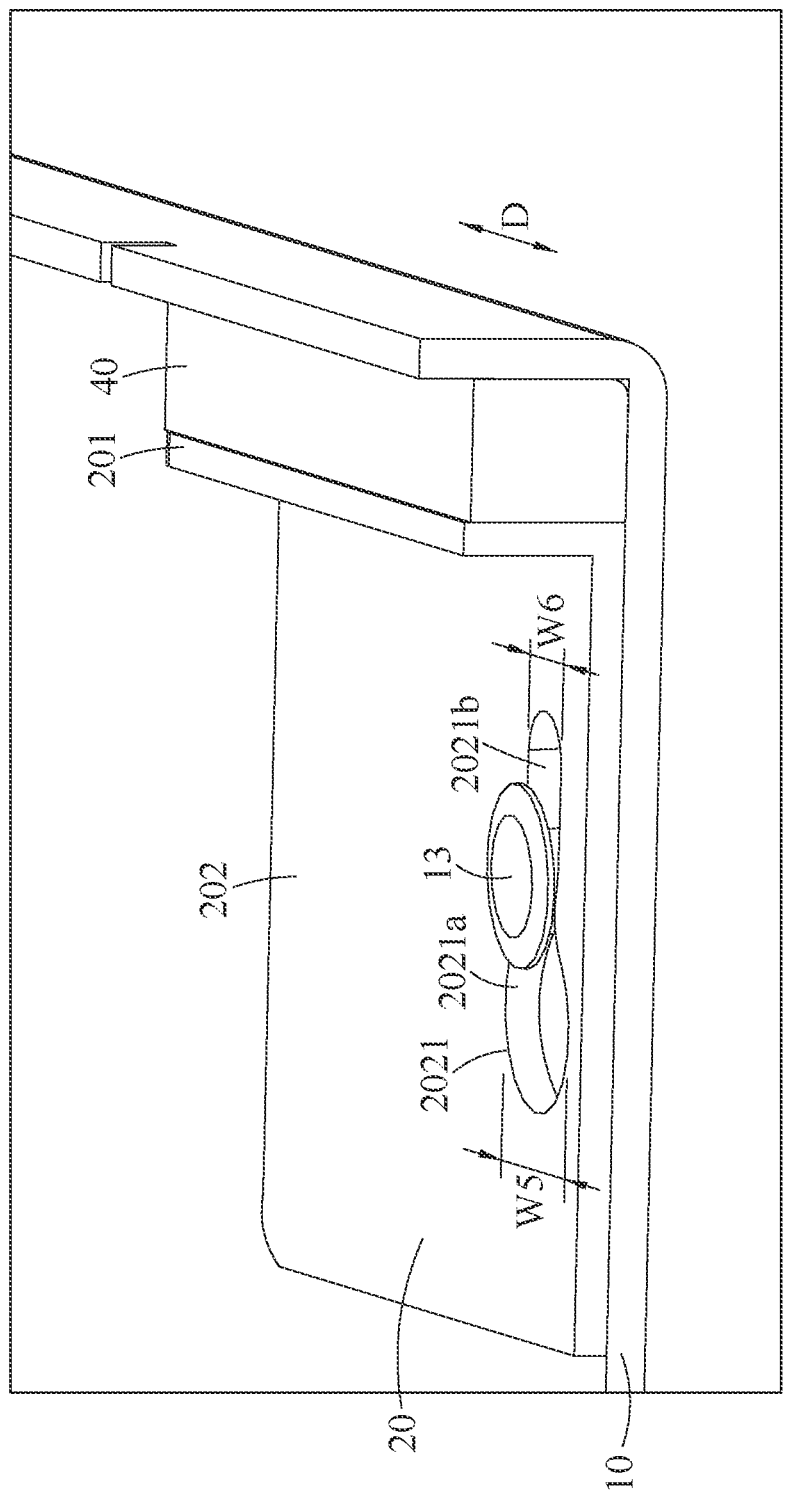
FIG. 13 is a three-dimensional schematic diagram of a frame body, a positioning unit, and an elastic unit according to the second embodiment.

Referring to FIG. 12a, FIG. 12b, and FIG. 13, a display device 100 (shown in FIG. 2) may include a frame body 10, a positioning unit 20, a light guide plate 30, and an elastic unit 40. In this embodiment, a positioning protrusion 13 is a back plate 102 located on the frame body 10, but in the first embodiment, the positioning protrusion 23 is located on the loading portion 202 of the positioning unit 20 (refer to FIG. 3 and FIG. 4a). In this embodiment, a limiting slot 2021 is located on a loading portion 202 of the positioning unit 20, but in the first embodiment, the limiting slot 1021 is located on the back plate 102 of the frame body 10 (refer to FIG. 3 and FIG. 4a).

Referring to FIG. 12a, FIG. 12b, and FIG. 13, the frame body 10 may include a side wall plate 101 and a back plate 102 connected to each other. The back plate 102 may include a positioning protrusion 13. The positioning protrusion 13 extends from the back plate 102 toward the positioning unit 20. In addition, the positioning unit 20 is located in frame body 10 and may include the loading portion 202, a side wall portion 201, and the limiting slot 2021. The loading portion 202 is substantially parallel to the back plate 102 and connected to the side wall portion 201. The side wall portion 201 is also substantially parallel to the side wall plate 101 of the frame body 10. The limiting slot 2021 is located on the loading portion 202 for the positioning protrusion 13 to fit in the limiting slot 2021.

The light guide plate 30 is located on the loading portion 202 and abuts against the side wall portion 201 of the positioning unit 20.

Figure 14:
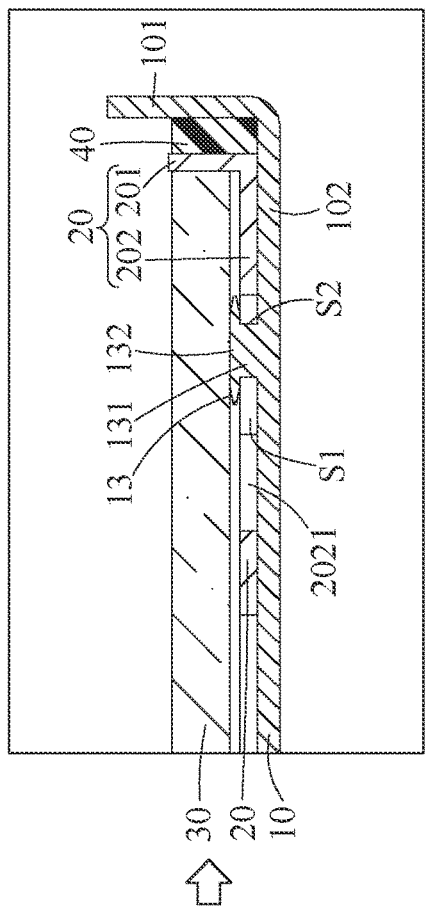
FIG. 14 is a partial schematic cross-sectional view (II) of the display device according to the second embodiment from another perspective.
Figure 15:
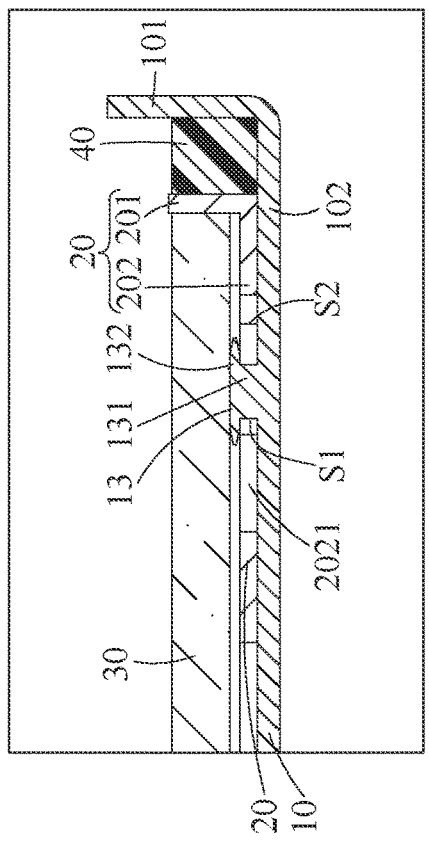
FIG. 15 is a partial schematic cross-sectional view (III) of the display device according to the second embodiment from another perspective.

Referring to FIG. 14 and FIG. 15, the elastic unit 40 is located in the frame body 10, which varies between a non-compressed state (as shown in FIG. 14) and a compressed state (as shown in FIG. 15). When the elastic unit 40 is in the non-compressed state, one end of the elastic unit 40 abuts against the side wall plate 101 of the frame body 10, and the other end abuts against the side wall portion 201 of the positioning unit 20 so that the positioning protrusion 13 is at a first position S1 of the limiting slot 2021 (as shown in FIG. 14). When the light guide plate 30 is heated to expand, a surface of the light guide plate 30 in contact with the side wall portion 201 abuts against the side wall portion 201, so that the positioning unit 20 moves, and the positioning protrusion 13 is driven to move to a second position S2 of the limiting slot 2021, so that the elastic unit 40 is pressed to be in the compressed state (as shown in FIG. 15).

When the elastic unit 40 is in the compressed state, the elastic unit 40 generates a change of form. The change of form is a change of the elastic unit 40 under pressure. For example, if a total volume of the elastic unit 40 remains the same but a shape changes, a contact area (an area of contact with the frame body 10 or an area of contact with the positioning unit 20) may increase, or the contact area may remain the same. For another example, the total volume of the elastic unit 40 becomes smaller, but the contact area remains the same (for example, the elastic unit becomes flatter), or the contact area may increase accordingly. The above description is an example instead of a limitation. The change of form of the elastic unit 40 depends on a material and an actual structural design of the frame body 10 and the positioning unit 20.

Referring to FIG. 14 and FIG. 15, regardless of whether the elastic unit 40 is in the compressed state or the non-compressed state, the light guide plate 30 and the elastic unit 40 abut against the side wall portion 201 of the positioning unit 20. Therefore, an expansion space S (shown in FIG. 1) reserved between a light guide plate A and a positioning post B in a conventional backlight module is not required, so that a light leakage from the expansion space can be avoided. In addition, when the light guide plate 30 expands or shrinks due to a temperature, the positioning protrusion 13 is limited by the limiting slot 2021 in a wide edge direction D (that is, a direction D in FIG. 13) of the limiting slot 2021 and does not move, so that the positioning unit 20 can be limited, thereby limiting the light guide plate 30.

Referring to FIG. 12*a*, FIG. 12*b*, and FIG. 13, in some implementations, the limiting slot 2021 includes a first slot portion 2021*a* and a second slot portion 2021*b*, the positioning protrusion 13 includes a support portion 131 and a top portion 132, a width W5 of the first slot portion 2021*a* is greater than a width W6 of the second slot portion 2021*b*, and a width W7 of the top portion 132 is greater than a width W8 of the support portion 131. The top portion 132 of the positioning protrusion 13 extends through the first slot portion 2021*a* so that the support portion 131 moves in the first slot portion 2021*a* and the second slot portion 2021*b*.

Referring to FIG. 12*b* and FIG. 13, further, the width W5 of the first slot portion 2021*a* is greater than or equal to the width W7 of the top portion 132, and the width W6 of the second slot portion 2021*b* is less than the width W7 of the top portion 132. During assembly, the top portion 132 is first caused to extend through the first slot portion 2021*a* so that the support portion 231 enters the limiting slot 2021, then the positioning protrusion 13 is moved to a position corresponding to the second slot portion 2021*b*, and the elastic unit 40 is placed. In this case, the support portion 131 is located in the second slot portion 2021*b*, and the top portion 132 is located above an upper surface 202*a* of the loading portion 202. Since the width W6 of the second slot portion 2021*b* is less than the width W7 of the top portion 132, the top portion 132 is limited by the second slot portion 2021*b* and does not move downward out of the limiting slot 2021.

Referring to FIG. 12*a*, in some embodiments, the display device 100 (shown in FIG. 2) may further include a panel unit 50 and a rubber frame 60. The rubber frame 60 is positioned on the frame body 10, and the panel unit 50 is positioned on the rubber frame 60 and superimposed on the light guide plate 30. When the light guide plate 30 is heated, the positioning unit 20 may be driven to move relative to the panel unit 50. That is to say, since the panel unit 50 is fixed to the rubber frame 60 and does not move, when the light guide plate 30 is heated to expand, the positioning unit 20 to move relative to the panel unit 50.

Referring to FIG. 12*b*, in some implementations, the light guide plate 30 may include a recess 31 located on a side of the light guide plate 30, and an opening of the recess 31 faces the side of the light guide plate 30. That is to say, the recess 31 is a recessed structure of the light guide plate 30 on the side. Therefore, the side wall portion 201 of the positioning unit 20 may fit in the recess 31 to engage the light guide plate 30 with the positioning unit 20. In this case, a top surface 201*b* of the side wall portion 201 is substantially coplanar with a top surface 30*a* of the light guide plate 30. That is to say, the side wall portion 201 does not protrude from the light guide plate 30, but the present invention is not limited thereto.

Figure 16:
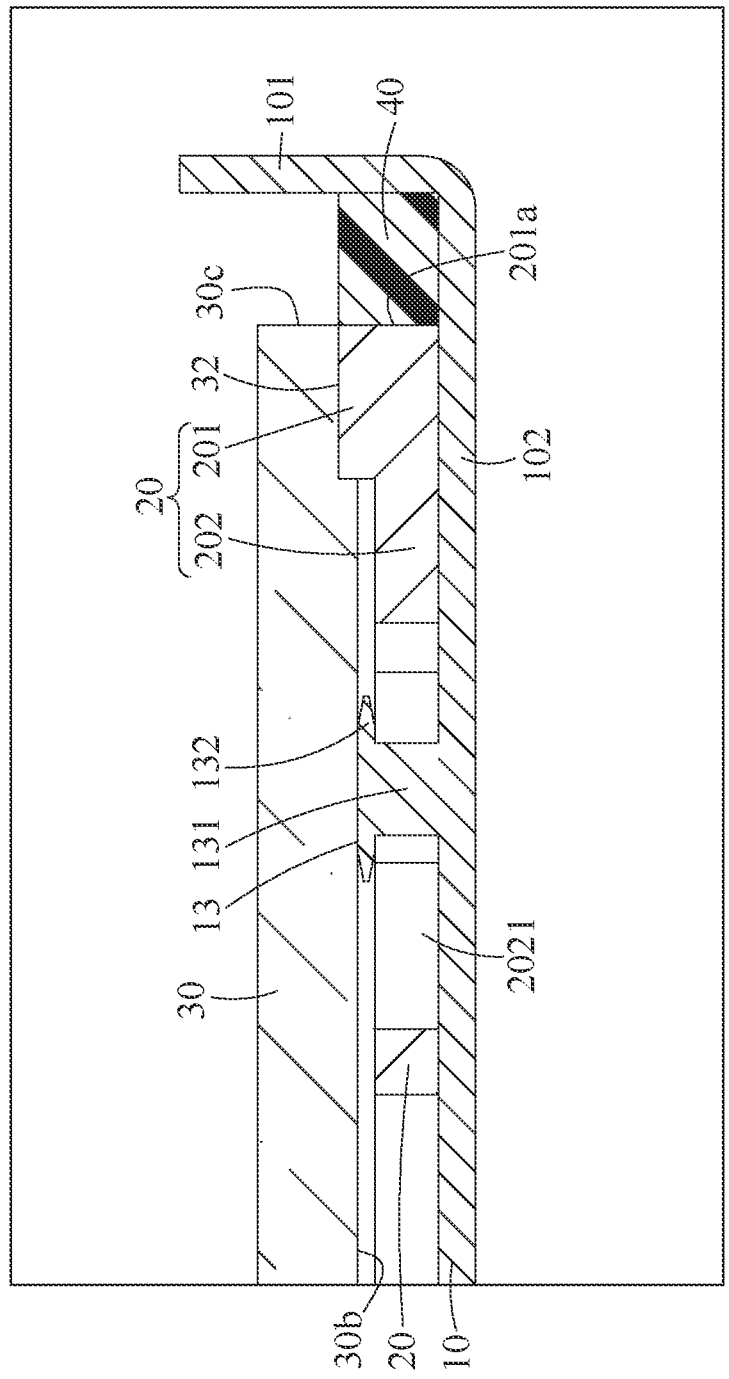
FIG. 16 is a partial schematic cross-sectional view (□) of the display device according to the second embodiment from another perspective.

Referring to FIG. 16, in some embodiments, the light guide plate 30 may include a bottom surface 30*b* and a fitting slot 32. The bottom surface 30*b* faces the loading portion 202, and the fitting slot 32 is located on the bottom surface 30*b*, that is, the fitting slot 32 is a recessed structure of the light guide plate 30 on the bottom surface 30*b*. A thickness of the light guide plate 30 at the fitting slot 32 is less than thicknesses at other positions (where the fitting slot 32 is not arranged) in a direction substantially perpendicular to a horizontal plane. Therefore, the side wall portion 201 of the positioning unit 20 may fit in the fitting slot 32 to engage the light guide plate 30 with the positioning unit 20, thereby positioning the light guide plate 30. In FIG. 16, the side wall surface 30*c* of the light guide plate 30 and the side wall surface 201*a* of the side wall portion 201 facing the frame body 10 are substantially coplanar, but the present invention is not limited thereto. The light guide plate 30 may alternatively protrude from the side wall portion 201, so that a part of the light guide plate 30 is located above the elastic unit 40.

According to the display device 100 of the present invention, the light guide plate 30 and the elastic unit 40 of the display device abut against the side wall portion 201 of the positioning unit 20, which does not require an expansion space S reserved between a light guide plate A and a positioning post in a conventional backlight module, so that a light leakage from the expansion space S can be avoided. In addition, when the light guide plate 30 expands or shrinks due to a temperature, the positioning protrusion 23 (or the positioning protrusion 13) is limited by the limiting slot 1021 (or the limiting slot 2021) in the wide edge direction D and does not move, so that the positioning unit 20 can be limited, thereby limiting the light guide plate 30.

What is claimed is:

1. A display device, comprising:
    a frame body, comprising a side wall plate and a back plate which are connected to each other, wherein the back plate comprises a limiting slot;
    a positioning unit, located in the frame body and comprising a loading portion, a side wall portion, and a positioning protrusion, wherein the loading portion is substantially parallel to the back plate and connected to the side wall portion, and the positioning protrusion is located on the loading portion and extends toward the back plate to fit in the limiting slot;
    a light guide plate, located on the loading portion and abutting against the side wall portion;
    an elastic unit, located in the frame body and having a compressed state or a non-compressed state, wherein when the elastic unit is in the non-compressed state, one end of the elastic unit abuts against the side wall plate, and the other end abuts against the side wall portion so that the positioning protrusion is at a first position of the limiting slot, and when the light guide plate is heated, the positioning protrusion is driven to move to a second position of the limiting slot, and the elastic unit is pressed to be in the compressed state;
    a panel unit; and
    a rubber frame, the rubber frame is positioned on the frame body, the panel unit is positioned on the rubber frame and superimposed on the light guide plate, and when the light guide plate is heated, the positioning unit is driven to move relative to the panel unit.

2. The display device according to claim 1, wherein the elastic unit generates a change of form when the elastic unit is in the compressed state.

3. The display device according to claim 1, wherein the limiting slot comprises a first slot portion and a second slot portion, the positioning protrusion comprises a support portion and a top portion, a width of the first slot portion is greater than a width of the second slot portion, a width of the top portion is greater than a width of the support portion, and the top portion of the positioning protrusion extends through the first slot portion so that the support portion moves in the first slot portion and the second slot portion.

4. The display device according to claim 1, wherein the light guide plate comprises a recess located on a side of the light guide plate, the side wall portion of the positioning unit fits in the recess to engage the light guide plate with the positioning unit, and the side wall portion does not protrude from the light guide plate.

5. The display device according to claim 1, wherein the light guide plate comprises a bottom surface and a fitting slot, the bottom surface faces the loading portion, the fitting slot is located on the bottom surface, and the side wall portion of the positioning unit fits in the fitting slot to engage the light guide plate with the positioning unit.

6. A display device, comprising:
- a frame body, comprising a side wall plate and a back plate connected to each other, wherein the back plate comprises a positioning protrusion;
- a positioning unit, located in the frame body and comprising a loading portion, a side wall portion, and a limiting slot, wherein the loading portion is substantially parallel to the back plate and connected to the side wall portion, and the limiting slot is located on the loading portion for the positioning protrusion to fit in;
- a light guide plate, located on the loading portion and abutting against the side wall portion;
- an elastic unit, located in the frame body and having a compressed state or a non-compressed state, wherein when the elastic unit is in the non-compressed state, one end of the elastic unit abuts against the side wall plate, and the other end abuts against the side wall portion so that the positioning protrusion is at a first position of the limiting slot, and when the light guide plate is heated, the positioning protrusion is driven to move to a second position of the limiting slot, and the elastic unit is pressed to be in the compressed state;
- a panel unit; and
- a rubber frame, wherein the rubber frame is positioned on the frame body, the panel unit is positioned on the frame body and superimposed on the light guide plate, and when the light guide plate is heated, the positioning unit is driven to move relative to the panel unit.

7. The display device according to claim 6, wherein the limiting slot comprises a first slot portion and a second slot portion, the positioning protrusion comprises a support portion and a top portion, a width of the first slot portion is greater than a width of the second slot portion, a width of the top portion is greater than a width of the support portion, and the top portion of the positioning protrusion extends through the first slot portion so that the support portion moves in the first slot portion and the second slot portion.

8. The display device according to claim 6, wherein the light guide plate comprises a recess located on a side of the light guide plate, the side wall portion of the positioning unit fits in the recess to engage the light guide plate with the positioning unit, and the side wall portion does not protrude from the light guide plate.

9. The display device according to claim 6, wherein the light guide plate comprises a bottom surface and a fitting slot, the bottom surface faces the loading portion, the fitting slot is located on the bottom surface, and the side wall portion of the positioning unit fits in the fitting slot to engage the light guide plate with the positioning unit.

10. The display device according to claim 6, wherein the elastic unit generates a change of form when the elastic unit is in the compressed state.

\* \* \* \* \*